United States Patent [19]
Teeter

[11] Patent Number: 6,111,817
[45] Date of Patent: Aug. 29, 2000

[54] TOWED BODY YAW ANGLE SENSOR

[75] Inventor: Michael A. Teeter, West Hills, Calif.

[73] Assignee: L-3 Communications Corporation

[21] Appl. No.: 09/256,444

[22] Filed: Feb. 23, 1999

[51] Int. Cl.[7] .................................................. H04B 17/00
[52] U.S. Cl. ............................ 367/13; 367/130; 367/106
[58] Field of Search .................................. 367/130, 106, 367/19, 13, 12, 131

[56] References Cited

U.S. PATENT DOCUMENTS

| | | | |
|---|---|---|---|
| 4,554,650 | 11/1985 | Brown et al. | 367/154 |
| 4,992,999 | 2/1991 | Yerby et al. | 367/130 |
| 5,412,621 | 5/1995 | Hepp | 367/154 |
| 5,844,860 | 12/1998 | Miller | 367/154 |

*Primary Examiner*—Daniel T. Pihulic
*Attorney, Agent, or Firm*—Roberts & Mercanti, LLP

[57] ABSTRACT

A towed body yaw angle sensor arrangement used to sense the angle between the axis of a tow fish and the flow of water. The water flow vector is used as the reference for correcting towed body yaw so that a magnetic compass in the towed body is aligned with the towed arrays streaming in the water flow. A yaw angle in the towed body with respect to the flow will cause errors for target bearing and skew the arrays relative to each other which will also cause errors. The flow sensor must be in the free flow off the towed body and ideally the sensing part is aligned with water current flow. Also provided is a method for sensing and correcting a yaw angle.

18 Claims, 2 Drawing Sheets

TOWED BODY YAW ANGLE SENSOR

BACKGROUND OF THE INVENTION

1. Field of the Invention

The present invention pertains to sonar sensors. More particularly, the invention relates to a system for sensing the direction of travel of a water borne, flexible, towed array of acoustic transducers or hydrophone sensors being drawn by a towed body which in turn is being pulled by a ship.

2. Description of the Prior Art

It is well known in the field of sonar systems to pull a submersible towed body behind a water craft. The towed body in turn draws behind it one or more flexible towed arrays of water borne hydrophone sensors. Such sensors are useful for detecting the position of underwater sonar contacts. Towed arrays of hydrophones are well known in the art. Such are long, continuous, neutrally buoyant hose lines, often several hundred meters long, which periodically contain numerous hydrophone receivers. Typically, these elongate arrays have a number of sensor elements in modules, along with their associated electronics and control leads, contained within a hose-shaped structure that extends through the water. The hydrophones are connected by suitable electronics on a towing vessel which indicates the bearing of an identified underwater target. Exemplary towed arrays are described in U.S. Pat. Nos. 4,554,650 and 5,412,621. In locating submerged bodies, sonar is either used passively, through reception of signals sent through water, or actively. In an active sonar system a pulse of sound is sent into the water by a sonar projector. The sound is then reflected back from the target and detected by the hydrophone arrays as an echo. This echo is received as mechanical energy by an acoustic transducer, converted into electrical energy, and read by a computer on an attached vessel to pinpoint the location of objects within the water. As shown in U.S. Pat. No. 5,844,860, elongated, hose-like towed arrays of hydrophones attached to the rear end of towed bodies are commonly used for the acoustic sensing of moving objects within the ocean.

A problem with the typical towed array is that it must be properly aligned or the acoustic signals received may not indicate the true horizontal direction of underwater objects. To accurately locate the position of an underwater object it is necessary to know the direction of the towed arrays with respect to the direction of the towed body axis. The towed body tends to react to the movement of the ship as it is pulled through water, while the towed arrays line up with the varying water current flows. Frequently, a yaw angle between the axis of a towed body and the direction of water current flow across the body will form during travel through water. The angular difference between the towed body axis and water flow angle or "yaw" angle will cause a contact bearing error in sonar systems which have free streaming towed array sensors attached to a towed body. Thus a yaw angle in the towed body with respect to current flow will cause errors for target bearing and skew the arrays relative to each other. Designs of existing towed arrays systems use one or more small and expensive heading sensors in each array to sense array direction. One solution to sensing the direction of the towed arrays is to incorporate magnetic compass sensors within the towed arrays, but these are very expensive due to their small size and the requirement to operate with the towed arrays rotated to any angle about their towing axis. These small heading sensors are expensive, difficult to integrate into the array and require elaborate and expensive facilities to perform calibration once installed. Such small heading sensors are about one inch in diameter and seven inches long. One cannot spin an array around its horizontal axis to calibrate the heading sensor in a fixed magnetic field so a calibrated magnetic field created by a set of computer driven coils arranged in a large cube is spun around the sensor within the laid out array (Helmholtz coil arrangement). Also, the sensor must be able to sense the magnetic field in any rotational orientation about its axis so the design has a 360 degree tilt sensor which is used to compensate the heading measurement as the array rolls relative to the horizontal.

A more effective alternative method for sensing and correcting a yaw angle would be desired. A lower cost solution is to provide a single low cost, self calibrating heading sensor in the towed body along with the towed body yaw sensor. The towed body heading sensor measures the bearing of the towed body centerline which is ideally aligned with the water flow. The yaw angle sensor measures the angle of the towed body relative to the water flow direction.

The present invention provides a towed body yaw angle sensor arrangement where a vessel draws a towed body and the towed body pulls a towed array. A submersible towed body is provided with a pivoting fin extending outwardly from a surface of the body, which fin aligns with the direction of flow of water along the fin. A magnetic compass is fixed to the body which calibrated to the central axis of the body and determines a heading of the central axis of the body. Suitable means determine an angle between the fin and the central axis. Since the fin and the towed array are free to align with the direction of water flow, the fin direction is indicative of the array direction. Thus the angle between the fin direction and the axis of the towed body indicates a correction angle between the array direction and the towed body heading. This angle corrects the bearing angle of a target as reported by the array.

SUMMARY OF THE INVENTION

The invention provides a towed body yaw angle sensor arrangement which comprises:

a) a submersible body having a fin extending outwardly from a surface of the body, which fin is attached to and capable of pivoting about an upright dowel perpendicular to the surface of the body; which fin aligns with the direction of flow of water along the fin when the body is towed through water;

b) a magnetic compass fixed to the body and calibrated to the central axis of the body for determining a heading of the central axis of the body when the body is towed through water; and c) means for determining an angle between the fin and a central axis of the submersible body.

The invention also provides a method for sensing a towed body yaw angle which comprises:

i) providing a towed body yaw angle sensor arrangement which comprises:

a) a submersible body having a fin extending outwardly from a surface of the body, which fin is attached to and capable of pivoting about an upright dowel perpendicular to the surface of the body; which fin aligns with the direction of flow of water along the fin when the body is towed through water;

b) a magnetic compass fixed to the body and calibrated to the central axis of the body for determining a heading of the central axis of the body when the body is towed through water;

c) means for determining an angle between the fin and a central axis of the submersible body; and ii) determining a heading of the central axis of the body when the body is towed through water;

iii) determining an angle between the fin and a central axis of the submersible body; and iv) calculating an angular difference between the heading of the central axis of the body and the fin.

The invention further provides a method for correcting a towed body yaw angle which comprises:

i) providing a towed body yaw angle sensor arrangement which comprises:

a) a submersible body having a fin extending outwardly from a surface of the body, which fin is attached to and capable of pivoting about an upright dowel perpendicular to the surface of the body; which fin aligns with the direction of flow of water along the fin when the body is towed through water;

b) a magnetic compass fixed to the body and calibrated to the central axis of the body for determining a heading of the central axis of the body when the body is towed through water; and c) means for determining an angle between the fin and a central axis of the submersible body;

ii) determining a heading of the central axis of the body when the body is towed through water;

iii) determining an angle between the fin and a central axis of the submersible body;

iv) calculating an angular difference between the heading of the central axis of the body and the fin; and v) aligning the central axis of the body with the water flow.

DETAILED DESCRIPTION OF THE PREFERRED EMBODIMENT

Figure 1:
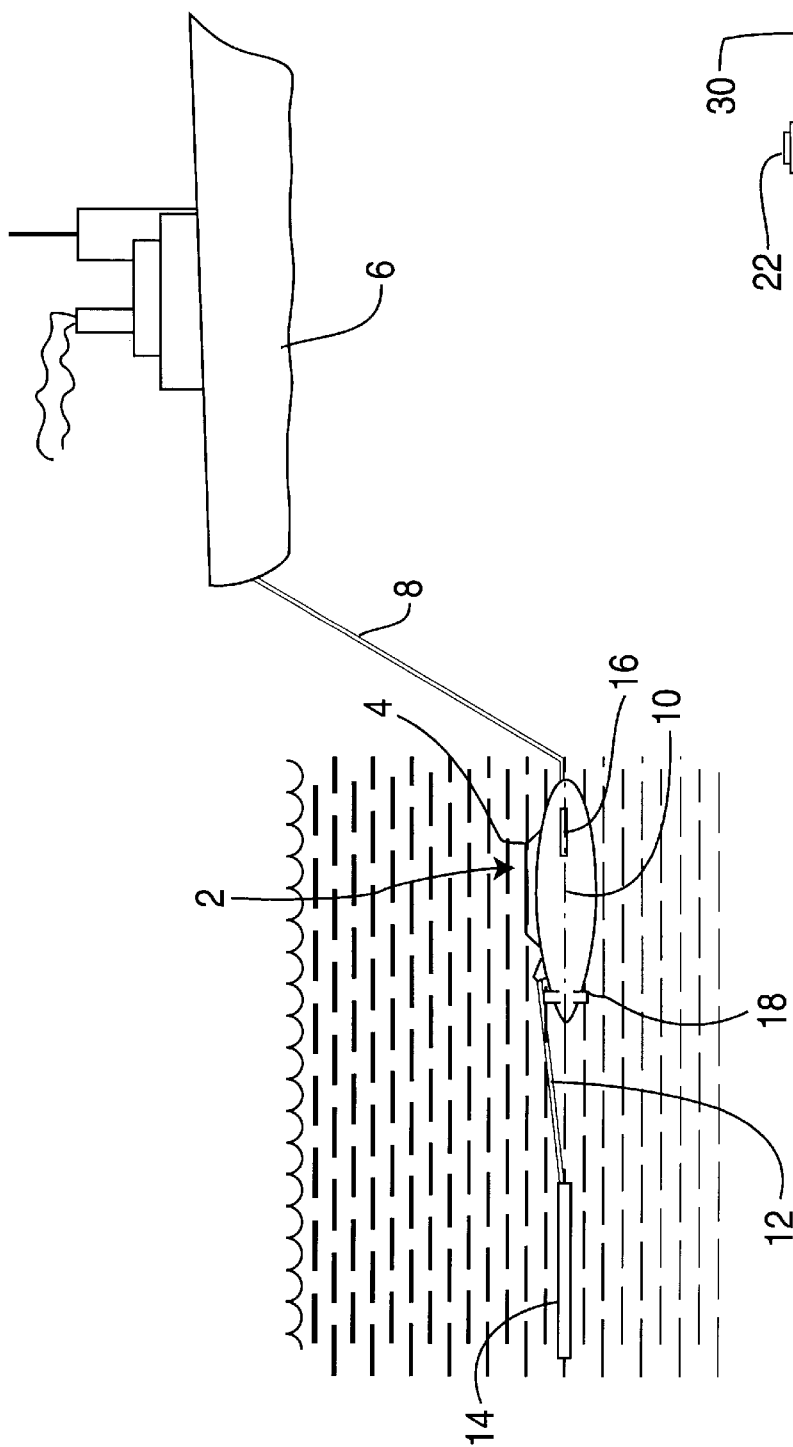
FIG. 1 is a schematic, side view of a towed body arrangement.

Referring to FIG. 1, there is shown a towed body arrangement according to the invention. The arrangement comprises a submersible towed body 2 having a sensor fin 4 extending outwardly from a surface of the body. The towed body is submersible to a controllable depth and is deployed behind a towing vessel 6 via a towing cable or umbilical 8 that physically and electrically connects suitable electronics on the vessel 6 to the towed body 2. The fin 4 extends from either a top or bottom surface of the body 2 and is attached to and capable of pivoting about a point perpendicular to the surface of the body 2. The fin 4 is initially aligned with the central axis 10 of the towed body but aligns with the direction of flow of water along the fin 4 when the body 2 is towed through water. Towed body 2 draws one or more towed arrays of hydrophones 14 via a umbilical cable 12 which both draws the arrays and electrically connects the arrays to suitable electronics on the vessel 6. Preferably the towed arrays 14 comprises neutrally buoyant, flexible, hose walled devices which align with the flow of water. Such arrays 14 have long been used for the sensing of acoustic pressures and their configurations are many and varied to provide a desired sensing and frequency response. Preferably the towed body 2 has means for controlling its depth such as side fins 16 on alternate sides of the body. Also the arrangement preferably further comprises means for aligning the central axis of the body with the water flow when the body is towed through water, such as by one or more rudders 18.

Figure 3:
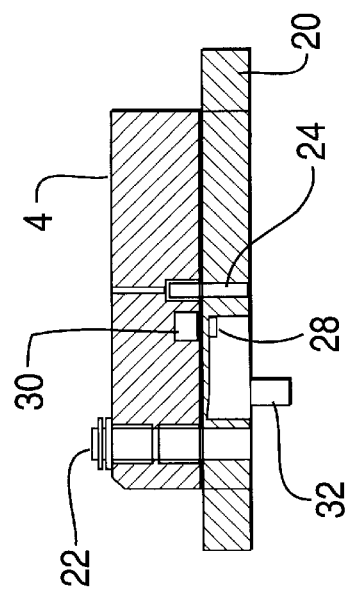
FIG. 3 shows an elevational view of a sensor on the towed body arrangement according to the invention.
Figure 2:
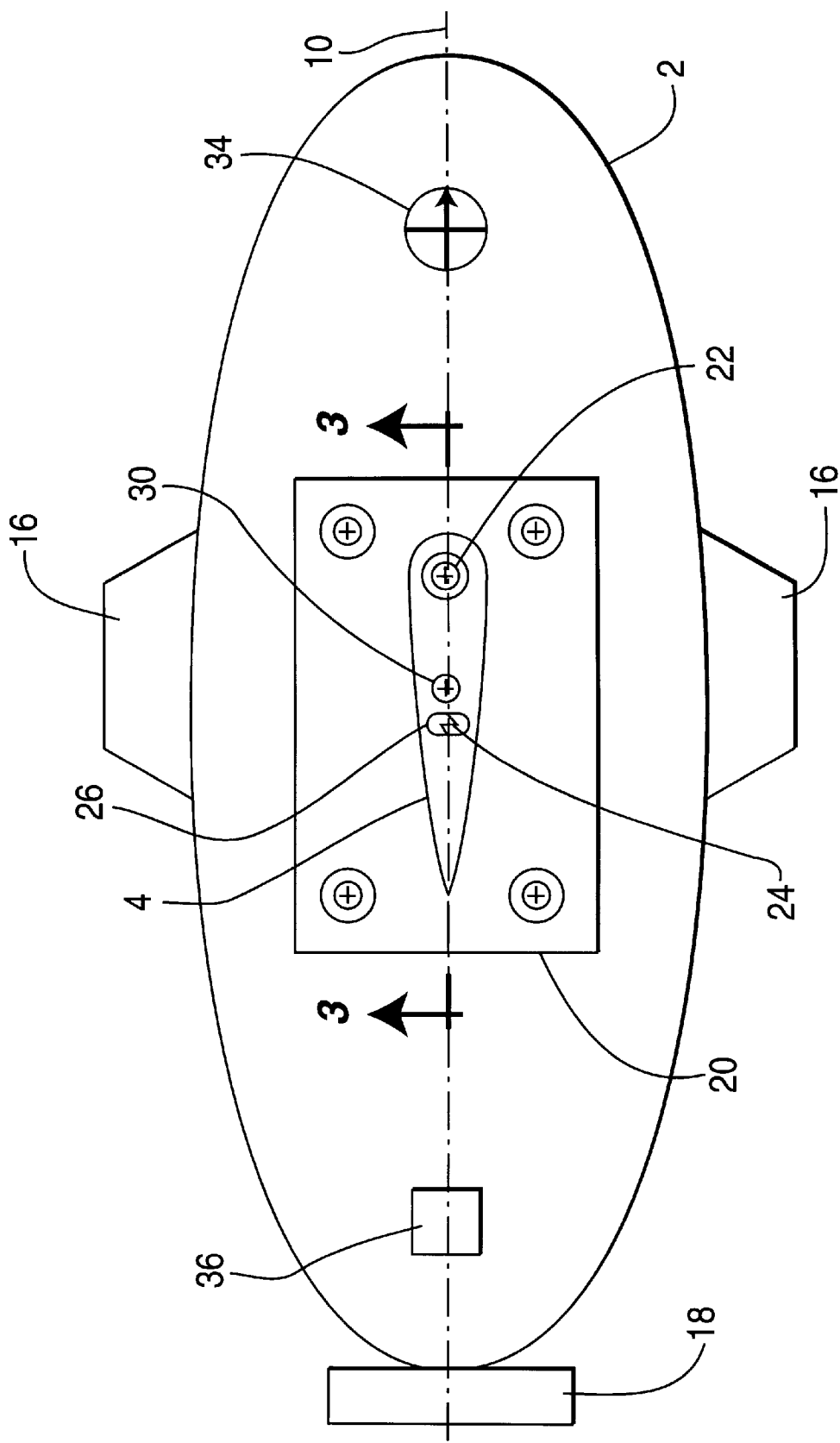
FIG. 2 is a plan view of a sensor on a towed body arrangement.

FIG. 2 shows a plan view of a sensor on a towed body arrangement. It shows fin 4 on a mounting plate 20 which is attached to the top surface of towed body 2 perpendicular to a horizontal plane through the central axis of the body. Alternatively the fin may extend from a bottom surface of the body perpendicular to a horizontal plane through the central axis of the body. Fin 4 is pivotable about a mounting dowel 22. The sensor is aligned to center axis 10 of the towed body 2 using a high precision mounting dowel pin 22 press fit into the towed body structure. The pin fits into the sensor base to align its center axis with the axis of the towed body to within +/−0.1 degrees. The degree of pivot of the fin 4 about the dowel 22 is limited by a stop 24 attached to the body 2 and located within a slot 26 which extends through fin 4. A bearing reference for the towed body is a magnetic compass 34 fixed to the towed body 2 as shown in FIG. 2. The compass 34 is aligned with the central axis of the body 2 for determining a heading of the central axis 10 of the body 2 when the body is towed through water. Preferably the compass is aligned to within ±0.1° of the central axis of the body. The inventive arrangement also comprises means for determining an angle between the fin and a central axis of the submersible body. As shown in FIG. 3, the degree of pivot of fin 4 is sensed by Hall effect sensor 28 which is activated by a magnet 30 on the fin. Sensing information is relayed to the electronics on the towing vessel via cable 8. The angle between the fin and a central axis of the submersible body is a difference calculation between the position of the fin as indicated by the sensor and the bearing of the central axis as determined by the compass. This may be done by a computer which continually receives such bearing and positioning information via umbilical cable 8.

Incorporated as part of the inventive arrangement is a sonar projector 36. As shown in FIG. 2, the sonar projector 36 may be incorporated within the body 2. In other embodiments, the projector 36 may be located on the body 2, deployed either with or behind the body 2, or may be on the towing vessel 6. The projector 36 sends out acoustic waves that reflect off a target in the sea, and return echoes are received by towed arrays 14. Once the reflected acoustic signals are received by arrays 14 they are converted into electrical signals and transmitted to a computer on the towing vessel 6. A continuous signal is sent via cable 8 to a computer on tow vessel 6 records the position of the central axis 10. When the central axis 10 of the body 2 becomes yawed with respect to the water flow due to non-uniform drag across the body, the compass does not accurately sense the axis of the sonar receive sensors in the towed arrays 14. Accordingly, a magnet 30 on fin 4 along with a Hall effect magnetic field sensor 28 on or in the body 2 senses the angle of the fin due to the flow of water and thus measures the direction of the towed arrays 14.

The yaw angle data is continuously transmitted back to the towing vessel 6 via the towing cable 8 where it is received by a computer that calculates an angular difference between the heading of the central axis 10 of the body 2 and the angle of the fin 4. The yaw angle of the towed body may be eliminated by steering one or more rudders 18 on the body 2 to align the central body axis 10 with the water flow. Alignment correction of the towed body with the water flow also reduces sonar processing errors due to non-uniform array sensor geometry created by skewed array tow points when the towed body is yawed. The sensor may be calibrated by taking readings of the signal sent to a computer on the vessel 6 via cable 8 with the sensor fin aligned to +5°, −5°, and 0° tick marks on the top of the sensor base. The calibration of the sensor is easily maintained by periodically repeating these sensor readings with the fin aligned to the tick marks.

The invention also provides a method for sensing a towed body yaw angle. First the towed body yaw angle sensor arrangement is provided. The next steps are to determine the heading of the central axis of the body using compass 18 and the angle between the fin 4 and central axis 10 of the towed body 2 using sensor 28. Once these values are known, an angular difference between the heading of the central axis 10 and the fin 4 can be calculated. This is the towed body yaw angle. The invention further provides a method for correcting a towed body yaw angle. This includes each of the steps above with the further step of aligning the central axis of the body with the water flow using one or more rudders on the towed body 2.

While the present invention has been particularly shown and described with reference to preferred embodiments, it will be readily appreciated by those of ordinary skill in the art that various changes and modifications may be made without departing from the spirit and scope of the invention. It is intended that the claims be to interpreted to cover the disclosed embodiment, those alternatives which have been discussed above and all equivalents thereto.

What is claimed is:

1. A towed body yaw angle sensor arrangement which comprises:
   a) a submersible body having a fin extending outwardly from a surface of the body, which fin is attached to and capable of pivoting about an upright dowel perpendicular to the surface of the body; which fin aligns with the direction of flow of water along the fin when the body is towed through water;
   b) a magnetic compass fixed to the body and calibrated to the central axis of the body for determining a heading of the central axis of the body when the body is towed through water; and
   c) means for determining an angle between the fin and a central axis of the submersible body.

2. The arrangement of claim 1 comprising means for controlling the depth of the submersible body.

3. The arrangement of claim 1 wherein said fin extends from a top surface of the body perpendicular to a horizontal plane through the central axis of the body.

4. The arrangement of claim 1 wherein said fin extends from a bottom surface of the body perpendicular to a horizontal plane through the central axis of the body.

5. The arrangement of claim 1 further comprising means for calculating an angular difference between the heading of the central axis of the body and the fin when the body is towed through water.

6. The arrangement of claim 1 wherein the compass is aligned to within ±0.1° of the central axis of the body.

7. The arrangement of claim 1 further comprising means for towing said body through water.

8. The arrangement of claim 1 wherein said body further comprises sonar projector means.

9. The arrangement of claim 1 further comprising towed arrays of sonar receive sensors attached to the body such that they trail behind the body when the body is towed through water by a vessel.

10. The arrangement of claim 1 further comprising a plurality of free streaming towed arrays of sonar receive sensors attached to the body such that they trail behind the body when the body is towed through water by a vessel.

11. The arrangement of claim 10 wherein the towed arrays comprises neutrally buoyant flexible hose walled devices.

12. The arrangement of claim 1 further comprising means for aligning the central axis of the body with the water flow when the body is towed through water.

13. The arrangement of claim 12 wherein the means for aligning the central axis of the body with the water flow when the body is towed through water comprises one or more rudders on the body.

14. The arrangement of claim 1 wherein the means for determining an angle between the fin and a central axis of the submersible body comprises a magnet mounted on the fin which cooperates with a magnetic field sensor on the body.

15. The arrangement of claim 14 wherein the magnetic field sensor comprises a Hall effect integrated circuit.

16. The arrangement of claim 1 further comprising means for limiting the degree of pivot of the fin about the dowel.

17. A method for sensing a towed body yaw angle which comprises:
   i) providing a towed body yaw angle sensor arrangement which comprises:
      a) a submersible body having a fin extending outwardly from a surface of the body, which fin is attached to and capable of pivoting about an upright dowel perpendicular to the surface of the body; which fin aligns with the direction of flow of water along the fin when the body is towed through water;
      b) a magnetic compass fixed to the body and calibrated to the central axis of the body for determining a heading of the central axis of the body when the body is towed through water; and
      c) means for determining an angle between the fin and a central axis of the submersible body;
   ii) determining a heading of the central axis of the body when the body is towed through water;
   iii) determining an angle between the fin and a central axis of the submersible body; and
   iv) calculating an angular difference between the heading of the central axis of the body and the fin.

18. A method for correcting a towed body yaw angle which comprises:
   i) providing a towed body yaw angle sensor arrangement which comprises:
      a) a submersible body having a fin extending outwardly from a surface of the body, which fin is attached to and capable of pivoting about an upright dowel perpendicular to the surface of the body; which fin aligns with the direction of flow of water along the fin when the body is towed through water;
      b) a magnetic compass fixed to the body and calibrated to the central axis of the body for determining a heading of the central axis of the body when the body is towed through water; and
      c) means for determining an angle between the fin and a central axis of the submersible body;
   ii) determining a heading of the central axis of the body when the body is towed through water;
   iii) determining an angle between the fin and a central axis of the submersible body;
   iv) calculating an angular difference between the heading of the central axis of the body and the fin; and
   v) aligning the central axis of the body with the water flow.

* * * * *